M. H. SHOENBERG.
ELECTRIC HEATER.
APPLICATION FILED NOV. 7, 1910.
981,481.
Patented Jan. 10, 1911.
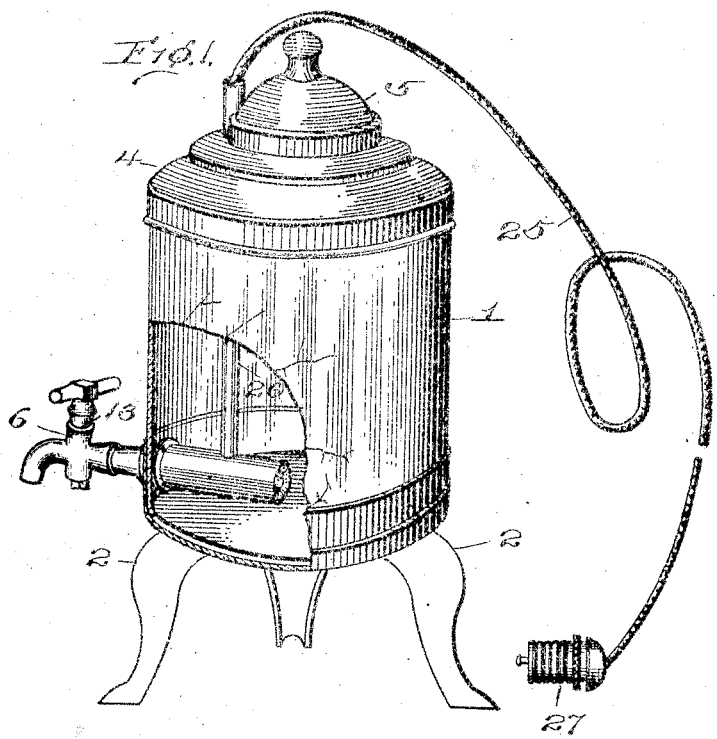
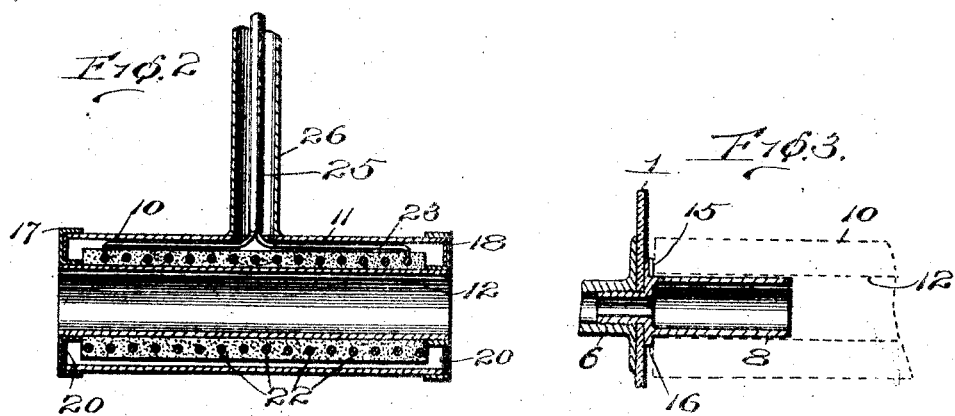
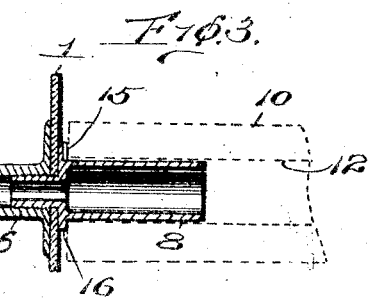
Witnesses
Inventor
Milton H. Shoenberg
By Eugene C. Brown
Attorney

UNITED STATES PATENT OFFICE.

MILTON H. SHOENBERG, OF SAN FRANCISCO, CALIFORNIA, ASSIGNOR TO PRESTO ELECTRICAL MANUFACTURING COMPANY, OF SAN FRANCISCO, CALIFORNIA, A CORPORATION OF CALIFORNIA.

ELECTRIC HEATER.

981,481.   Specification of Letters Patent.   Patented Jan. 10, 1911.

Application filed November 7, 1910. Serial No. 591,046.

*To all whom it may concern:*

Be it known that I, MILTON H. SHOENBERG, a citizen of the United States, residing at San Francisco, in the county of San Francisco and State of California, have invented new and useful Improvements in Electric Heaters, of which the following is a specification.

My invention relates to electrical heating vessels, and is particularly adapted to heating liquids.

One of the objects of my invention is to provide a construction which can be connected to an ordinary electric lighting circuit and which will quickly heat a quantity of water or other liquid.

One of the main features of my present invention is the arrangement by which a limited quantity of hot liquid is obtained almost immediately and before the entire body of liquid in the vessel has become heated.

With these objects in view, reference is made to the following description for a complete understanding of the invention, in connection with the accompanying drawings, in which—

Figure 1 is a perspective view of an electrical heating vessel embodying my invention and having a portion of the liquid receptacle broken away to show the manner of connecting the electric heating element; Fig. 2 is a longitudinal sectional view of one form of the heating element; and Fig. 3 is a longitudinal section through a portion of the spigot and its extension and showing the heater in dotted lines to indicate the manner of assembling the parts.

In the drawings, I have indicated a liquid-containing vessel or receptacle 1, which may be of any suitable size and shape and may be supported upon a stand or base 2. The vessel may be provided with a removable cover 4, which may conveniently have a separable cap 5, which can be removed for the purpose of filling the vessel without disturbing the main cover 4. A faucet or tap 6 is secured to the receptacle near the bottom for the purpose of drawing off the hot liquid.

As previously pointed out, one of the main features of my invention is the arrangement by which hot liquid may be drawn off almost immediately after the electric current is turned onto the heating element, and before the body of the liquid is heated. Instead of the usual hollow nut to secure the faucet in position, I provide the nut with a tubular extension 8 projecting into the receptacle to form a support for the electric heater 10, the bore of which forms a continuation of the faucet passage.

As hereinafter explained, the interior casing wall 12 of the heater is subjected to an intense heat by the resistance element, and will very quickly heat a small volume of water passing through the heater. If the stem 13 of the faucet be turned so that a small stream only may flow, the liquid will be raised to a high temperature at once, without waiting for the body of the liquid to become heated. For many purposes my apparatus may be thus employed as an instantaneous heater and it will only be necessary to switch on the electric current during the short period that the liquid is being drawn off. If the current is permitted to continue through the heater, the entire body of the liquid in the receptacle will soon become hot and will be maintained in this condition.

As it is essential that there should be a continual circulation through the interior passage of the heater, I make the bore of the heater slightly larger than the extension 8, so that there shall be a small crevice between the inner wall 12 and the tubular extension 8, and also provide several small channels 15 through the end flange 16, the latter serving to prevent the heater from coming into contact with the wall of the receptacle when it is being slid into position over the extension 8.

The electric heater comprises a tubular casing having concentric outer and inner walls 11, 12, forming an interior annular cavity which is tightly sealed at the ends by means of caps 17, 18, and interposed washers 20, which may be of mica. The inner sleeve or tube 12 is preferably brazed or otherwise secured at one end to the cap 18, the cap and inner tube being removable from the outer tube 11. The heating device comprises a resistance element of high resistance wire 22, mounted upon but insulated by means of some refractory material from the inner tube 12. I prefer to make the resistance element in the form of a helix or spiral embedded in a porcelain tube 23, the whole constituting a heating unit which may be slipped over the inner tube before the parts are assembled. After the inner tube carrying the resistance element has been inserted in the outer tube 11, the cap 17 is screwed over the threaded end of the tube 11, and securely seals the interior annular cavity. The ends of the resistance wire 22 are connected with the leads or conducting wires 25, which pass to the outside of the receptacle through a tube 26, connected with the outer casing wall and passing through an opening provided in the cover 4, the leads being connected to a terminal plug 27 adapted to be connected to any ordinary electric light socket.

The receptacle may be filled with liquid by removing the cap 5 of the cover. When it is desired to clean the receptacle, the heater 10 is first slid off of the extension member 8, and may then be fitted with the cover 4.

The many advantages of my invention will be apparent from the foregoing description. The heater may be employed to maintain the liquid in the receptacle hot. The heat is radiated from both the exterior and the interior walls of the heater casing, and a constant circulation of liquid is maintained through the bore or passage of the heater, thus permitting the resistance unit to be maintained at an intense heat without endangering the integrity of the heater, and enabling it to be operated at a very high efficiency. By properly graduating the flow of liquid through the faucet, hot liquid may be drawn off almost immediately after the electric current is switched onto the heater. Again, the body of the liquid may be maintained at a certain temperature while that which is drawn off may be raised to a higher temperature. The many uses to which my apparatus may be applied will suggest themselves to restaurateurs, druggists, and others who dispense hot liquids, as well as the householder.

While I have described in detail the structure shown in the drawings to illustrate one embodiment of my invention, it will be apparent to skilled artisans that many alterations and modifications may be made in the structure without departing from the spirit and scope of the invention. I therefore do not wish to be limited to the specific uses or to the specific construction herein disclosed.

I claim as new and desire to secure by Letters Patent—

1. An apparatus for heating liquids comprising a receptacle, a faucet connected thereto, and an electric heater having a tubular passage extending therethrough said passage forming a direct continuation of the faucet passage.

2. An apparatus for heating liquids comprising a receptacle, a faucet connected thereto, an electric heater having a tubular passage extending therethrough and forming a continuation of the faucet passage, and means for maintaining a circulation of liquid through the heater passage when the faucet is closed.

3. An apparatus for heating liquids comprising a receptacle, a faucet connected thereto and having an inner tubular extension projecting into the receptacle, a heating device comprising a tubular casing having inner and outer concentric walls open at both ends and having the bore thereof fitting over said extension, a tubular stem projecting from said casing, a resistance element within the cavity between said walls and insulated therefrom, said cavity being closed at both ends, and electrical conductors connected with the terminals of said element and extending through said stem.

In testimony whereof I have hereunto set my hand in presence of two subscribing witnesses.

MILTON H. SHOENBERG.

Witnesses:
 F. P. Foster,
 L. Adelsdorfer.